(12) United States Patent
Akimoto

(10) Patent No.: US 9,854,387 B2
(45) Date of Patent: Dec. 26, 2017

(54) MOBILE INFORMATION TERMINAL AND IMAGE FORMING APPARATUS CAPABLE OF CARRYING OUT NEAR-FIELD WIRELESS COMMUNICATION, SYSTEM, CONTROL METHOD THEREFOR, AND STORAGE MEDIUM

(71) Applicant: CANON KABUSHIKI KAISHA, Tokyo (JP)

(72) Inventor: Naoto Akimoto, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/737,553

(22) Filed: Jun. 12, 2015

(65) Prior Publication Data

US 2015/0365783 A1 Dec. 17, 2015

(30) Foreign Application Priority Data

Jun. 16, 2014 (JP) .................................. 2014-123320

(51) Int. Cl.
*H04W 4/00* (2009.01)
*G06F 3/12* (2006.01)

(52) U.S. Cl.
CPC .............. *H04W 4/008* (2013.01); *G06F 3/12* (2013.01)

(58) Field of Classification Search
CPC .. H04W 4/008; H04W 12/06; G06K 9/00885; A61B 5/117; G06F 21/32; H04N 2201/3233
USPC ........ 455/41.1, 41.2; 358/1.1, 1.15, 505, 115
See application file for complete search history.

(56) References Cited

U.S. PATENT DOCUMENTS

| | | | | |
|---|---|---|---|---|
| 8,749,823 | B2* | 6/2014 | Kato | G06F 3/1222 358/1.14 |
| 8,976,393 | B2* | 3/2015 | Park | H04N 1/00106 358/1.13 |
| 9,036,192 | B2* | 5/2015 | Watanabe | G06F 3/1212 358/1.13 |
| 2003/0020953 | A1* | 1/2003 | Van Den Tillaart | H04N 1/00915 358/1.15 |
| 2010/0315678 | A1* | 12/2010 | Smires | G06Q 20/223 358/1.15 |
| 2012/0264372 | A1* | 10/2012 | Chen | G06F 3/1204 455/41.1 |
| 2013/0191888 | A1* | 7/2013 | Chhabra | G06F 9/44526 726/5 |

(Continued)

FOREIGN PATENT DOCUMENTS

JP 2013187571 A 9/2013

*Primary Examiner* — Ankur Jain
*Assistant Examiner* — Max Mathew
(74) *Attorney, Agent, or Firm* — Rossi, Kimms & McDowell LLP

(57) ABSTRACT

A system which enables an image forming apparatus to give priority to executing a job sent from a mobile information terminal. The mobile information terminal sets an operating mode of the image forming apparatus. When a near-field wireless communication is started by the mobile information terminal coming close to the image forming apparatus, information on the set operating mode is sent to the image forming apparatus. The image forming apparatus provides operating mode shifting control based on the information on the operating mode sent from the mobile information terminal by the near-field wireless communication.

5 Claims, 13 Drawing Sheets

(56) References Cited

U.S. PATENT DOCUMENTS

| | | | | |
|---|---|---|---|---|
| 2013/0258402 A1* | 10/2013 | Arai | .................... | H04N 1/00344 358/1.15 |
| 2014/0355048 A1* | 12/2014 | Kang | .................... | G06F 3/1292 358/1.15 |
| 2015/0205558 A1* | 7/2015 | Oike | .................... | G06F 3/1253 358/1.15 |
| 2015/0230078 A1* | 8/2015 | Kandangath | ........ | H04L 67/1095 707/647 |
| 2015/0324149 A1* | 11/2015 | Murayama | ............ | G06F 3/1204 358/1.13 |
| 2015/0355871 A1* | 12/2015 | Nakata | .................. | G06F 3/1285 358/1.15 |
| 2016/0014112 A1* | 1/2016 | Gunning | ............... | H04W 4/008 713/159 |
| 2016/0065781 A1* | 3/2016 | Um | .................... | H04N 1/00204 358/1.15 |
| 2016/0085489 A1* | 3/2016 | Hansen | ................. | G06F 3/1204 358/1.15 |
| 2017/0064129 A1* | 3/2017 | Lee | .................... | H04N 1/00342 |

* cited by examiner

MOBILE INFORMATION TERMINAL AND IMAGE FORMING APPARATUS CAPABLE OF CARRYING OUT NEAR-FIELD WIRELESS COMMUNICATION, SYSTEM, CONTROL METHOD THEREFOR, AND STORAGE MEDIUM

BACKGROUND OF THE INVENTION

Field of the Invention

The present invention relates to a mobile information terminal, an image forming apparatus, a system, a control method therefor, and a storage medium, and in particular to a technique for controlling communication between a mobile information terminal and an image forming apparatus which are capable of carrying out near-field wireless communication such as NFC.

Description of the Related Art

In recent years, mobile information terminals such as smartphones and tablet terminals have begun to be adopted for work at offices. Also, mobile information terminals such as smartphones and tablets are equipped with communication means for near-field wireless communication (such as NFC: near-field communication), wireless LANs, and so on so as to easily carry out communications with a variety of devices. Further, image forming apparatuses with multiple functions such as copying, printing, and scanning functions have increasingly been equipped with communication means for near-field communication, wireless LANs, and so on as mentioned above.

Such image forming apparatuses offer a function of carrying out communications with mobile information terminals such as smartphones and tablets and working in conjunction with them. For example, an operation of having an image forming apparatus which is to perform printing recognized is performed on a mobile information terminal using near-field wireless communication, and an image on the mobile information terminal is sent from an application on the mobile information terminal to the image forming apparatus, which in turn performs printing (see, for example, Japanese Laid-Open Patent Publication (Kokai) No. 2013-187571).

However, problems described hereafter arises in the above described system configuration in which a mobile information terminal and an image forming apparatus are recognized using near field wireless communication, and after that, the image forming apparatus are caused to implement various functions through operation from the mobile information terminal.

Firstly, even after a process to have a mobile information terminal and an image forming apparatus recognized is carried out using near-field wireless communication, an operating unit of the image forming apparatus is available for use. When a job is submitted from the mobile information terminal, this submission is ordered via a wireless LAN interface recognized using near-field wireless communication, and hence there may be a case where the mobile information terminal is not operated near the image forming apparatus. In this case, before the mobile information terminal submits a job (for example, a print job), the image forming apparatus may be used by other users, and the job from the mobile information terminal may not be immediately executed.

Secondly, there is an image forming apparatus which requires an operation of shifting it into a scan-only mode at the time of performing a scanning function of sending an image scanned off by the image forming apparatus to a mobile information terminal. For example, to cause the image forming apparatus to perform scanning by operating the mobile information terminal after the mobile information terminal is recognized by the image forming apparatus using near-field wireless communication, an operation of shifting the image forming apparatus into a scan-only mode is required to be performed via an operating unit of the image forming apparatus, making user operation complicated.

SUMMARY OF THE INVENTION

The present invention provides a mobile information terminal, an image forming apparatus, a system, and a control method therefor, which enable the image forming apparatus to give priority to executing a job sent from the mobile information terminal, as well as a storage medium.

Accordingly, the present invention provides a system comprising a mobile information terminal, and an image forming apparatus, wherein said mobile information terminal comprises a setting unit that sets an operating mode of said image forming apparatus, and a sending unit that sends information on the operating mode set by the setting unit to said image forming apparatus in response to a near-field wireless communication being started by said mobile information terminal coming close to said image forming apparatus, and wherein said image forming apparatus comprises a control unit that provides operating mode shifting control based on the information on the operating mode sent from said mobile information terminal by the near-field wireless communication.

According to the present invention, since the operation of the image forming apparatus is allowed to be restricted according to a job sent from the mobile information terminal, the problem that the image forming apparatus is used by other users during near-field wireless communication is solved, and execution of a job sent from the mobile information terminal is given priority in the image forming apparatus.

Further features of the present invention will become apparent from the following description of exemplary embodiments (with reference to the attached drawings).

BRIEF DESCRIPTION OF THE DRAWINGS

FIGS. 15A to 15D are views showing exemplary screens displayed on a panel of the image forming apparatus, in which FIG. 15A shows an initial screen, FIG. 15B shows a restriction mode screen, FIG. 15C shows a scan mode screen, and FIG. 15D shows an authentication mode screen.

DESCRIPTION OF THE EMBODIMENTS

The present invention will now be described in detail with reference to the drawings showing an embodiment thereof.

Figure 1:
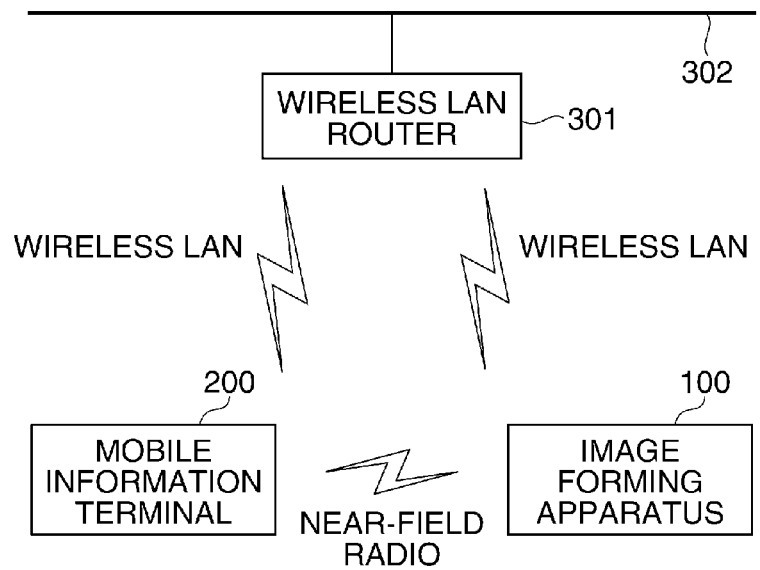
FIG. 1 is a diagram showing an exemplary network system in which an image forming apparatus according to the embodiment of the present invention is placed.

FIG. 1 is a diagram showing an exemplary network system in which an image forming apparatus according to the embodiment of the present invention is placed.

Referring to FIG. 1, the image forming apparatus 100 is comprised of, for example, a multifunctional peripheral having multiple functions. The image forming apparatus 100 is capable of carrying out wireless communications with a wireless LAN router 301 connected to a network 302 such as the Internet and is also capable of carrying out communications with other equipment (not shown) via the wireless LAN router 301 and the network 302.

A mobile information terminal 200 is comprised of a smartphone, a tablet terminal, or the like. As with the image forming apparatus 100, the mobile information terminal 200 is capable of carrying out wireless communications with the wireless LAN router 301 and is also capable of carrying out wireless communications with other equipment (not shown) via the wireless LAN router 301 and the network 302.

The mobile information terminal 200 and the image forming apparatus 100 are capable of carrying out wireless communications with each other via the wireless LAN router 301 as described above, and they are also capable of carrying out direct communications with each other through near-field wireless communication such as NFC.

Figure 2:
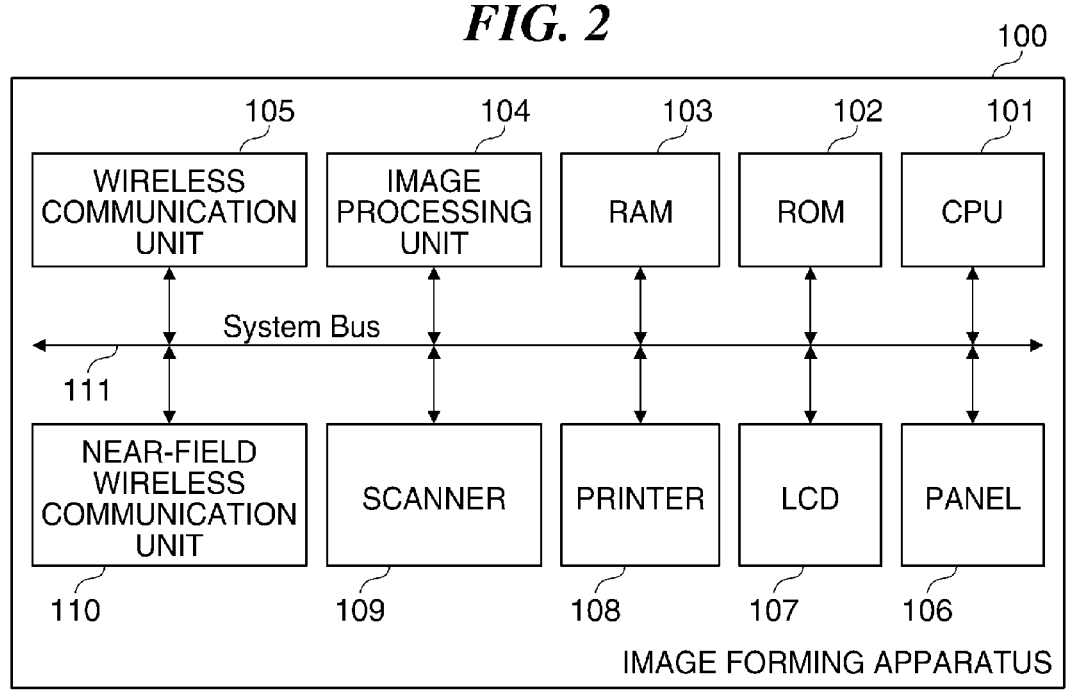
FIG. 2 is a block diagram schematically showing a hardware arrangement of the image forming apparatus in FIG. 1.

FIG. 2 is a block diagram schematically showing a hardware arrangement of the image forming apparatus 100 in FIG. 1.

Referring to FIG. 2, the image forming apparatus 100 has a CPU 101, a ROM 102, a RAM 103, an image processing unit 104, a wireless communication unit 105, an operating panel (panel) 106, and a display unit (LCD) 107. The image forming apparatus 100 also has a printer unit (printer) 108, a scanner unit (scanner) 109, and a near-field wireless communication unit 110.

The CPU 101 centrally controls various devices connected to a system bus 111 and executes firmware modules stored in the ROM 102. The firmware modules are comprised of at least two modules. The firmware modules are allowed to be updated on a module-by-module basis. The CPU 101 carries out processes in flowcharts, to be described later, based on the firmware modules which are control programs.

The RAM 103 acts as a main memory or a work area for the CPU 101 and is also used as a memory which is for use in storing device settings and capable of being backed up. Under the control of the CPU 101, the image processing unit 104 performs image processing such as decoding of print data received from an external device and conversion of the same into raw data, or compression of an image read by the scanner 109 into JPEG data.

The wireless communication unit 105 carries out wireless LAN communications according to wireless LAN standards. In the present embodiment, the wireless communication unit 105 is capable of establishing connection with the network 302 via the wireless LAN router 301 and carrying out communications with a wireless communication unit 207 of the mobile information terminal 200.

The panel 106 is an operating unit through which instructions from a user are input and comprised of a power key, a numeric keypad, a one-touch key, a start key, a stop key, a set key, a variety of setting keys, an LED, and so on, which are not shown.

The LCD 107 is a display unit on the panel 106 and under the control of the CPU 101, displays a device setting screen and a screen for deciding operations to provide the user with necessary information.

The printer 108 forms an image on a recording sheet using an electrophotographic method. The scanner 109 reads an image printed on a recording sheet. It should be noted that an automatic document feeder (not shown) is mounted as an option on the scanner 109 so that the scanner 109 can automatically read a plurality of originals.

The near-field wireless communication unit 110 carries out near-field wireless communications according to, for example, NFC (near-field communication) standards. NFC is a protocol for near-field communication with other communication devices by means of electromagnetic induction using carrier waves of a single frequency. As the frequency of the carrier waves, for example, the 13.56 MHz ISM (industrial scientific medical) frequency band is used. A data transfer speed is selectable from the following three speeds, 106 Kbps, 212 Kbps, and 424 Kbps. Communication becomes possible when the distance between two NFC communication devices falls within a certain predetermined range in which communication is possible (for example, 10 cm or 20 cm).

Figure 3:
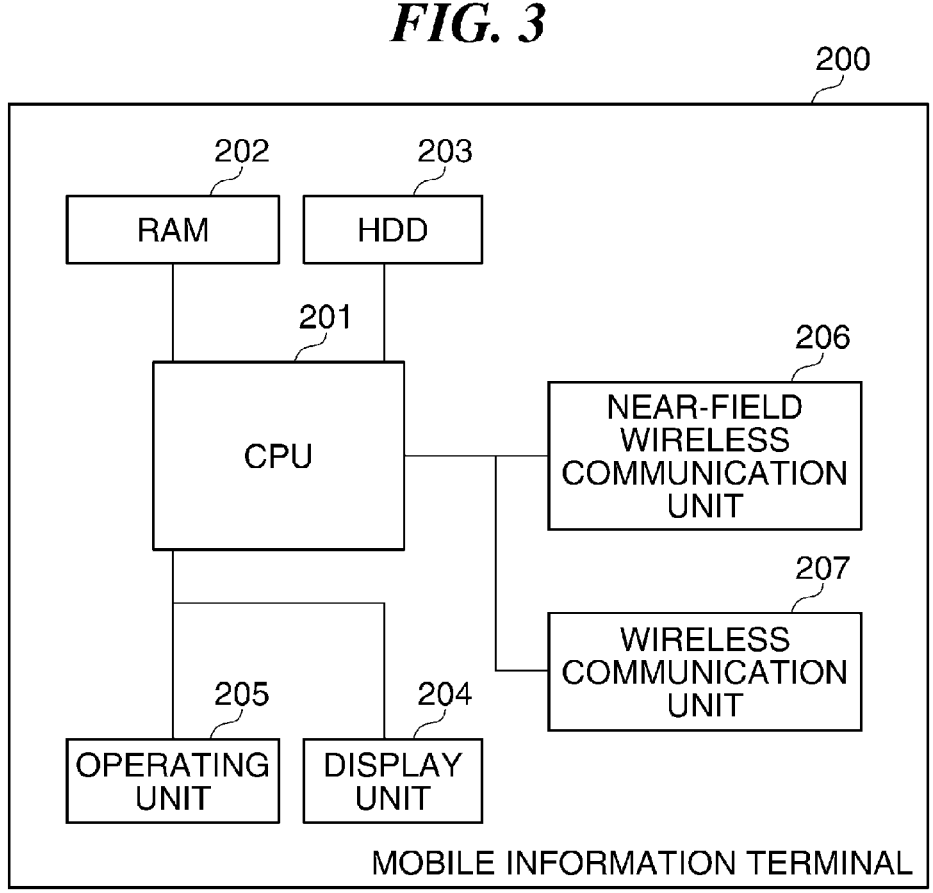
FIG. 3 is a block diagram schematically showing a hardware arrangement of a mobile information terminal in FIG. 1.

FIG. 3 is a block diagram schematically showing a hardware arrangement of the mobile information terminal 200 in FIG. 1.

Referring to FIG. 3, the mobile information terminal 200 has a CPU 201, a RAM 202, an HDD (hard disk drive) 203, a display unit 204, an operating unit 205, a near-field wireless communication unit 206, and the wireless communication unit 207.

The CPU 201 is an arithmetic device which controls the mobile information terminal 200 and performs data calculations and processing. The RAM 202 is a memory which temporarily retains data and is also a memory which acts as a work area where an application (hereafter referred to as an app) is expanded and executed. The HDD 203 is a nonvolatile memory which stores various data on the apparatus and apps for the apparatus.

The display unit 204 displays app operation results for the user. The operating unit 205 receives operations from the user. When the mobile information terminal 200 is a smartphone or a tablet, the display unit 204 and the operating unit 205 are implemented by an integral touch-panel display.

The near field wireless communication unit 206 carries out near-field communications according to, for example, NFC standards. In the present embodiment, the near-field wireless communication unit 206 is put close to and brought into contact with (caused to touch) the near-field wireless communication unit 110 of the image forming apparatus 100 to enable wireless communication according to NFC.

The wireless communication unit 207 carries out wireless LAN communications according to wireless LAN standards. In the present embodiment, the wireless communication unit 207 is capable of establishing connection with the network 302 via the wireless LAN router 301 and carrying out communications with the wireless communication unit 105 of the image forming apparatus 100.

Figure 4:
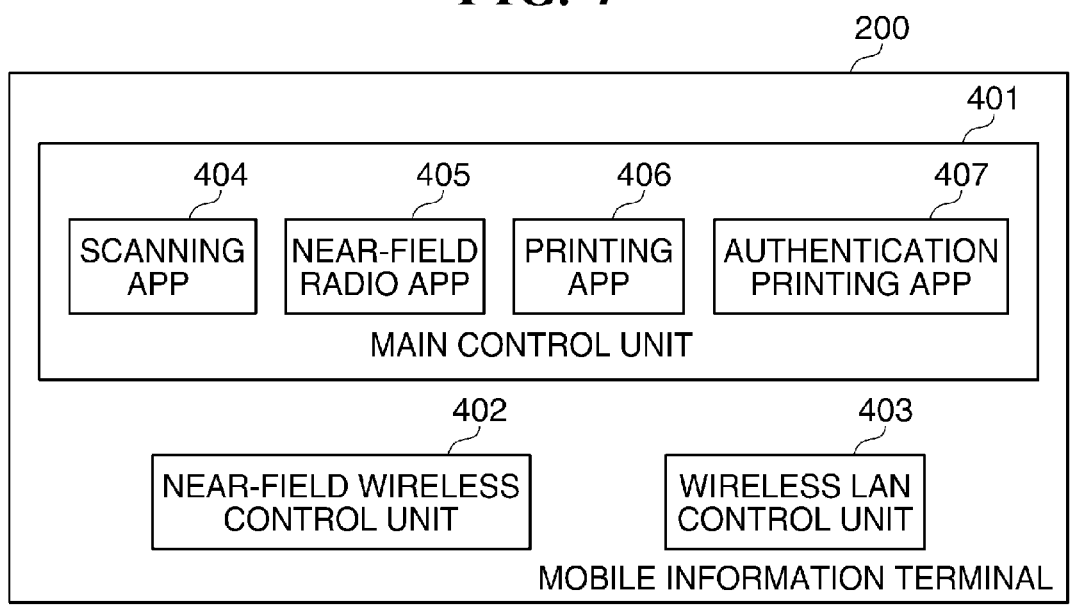
FIG. 4 is a block diagram schematically showing a software arrangement of the mobile information terminal.

FIG. 4 is a block diagram schematically showing a software arrangement of the mobile information terminal 200.

Referring to FIG. 4, the mobile information terminal 200 has a main control unit 401, a near-field wireless communication control unit 402, and a wireless LAN control unit 403.

In the main control unit 401, a scanning app 404, a near-field radio app 405, a printing app 406, and an authentication printing app 407 are present as apps. The CPU 201 starts and executes any of these apps.

The scanning app 404 is an app for performing a scanning function of a device on a network. In cooperation with the near field wireless control unit 402, the near-field radio app 405 is able to perform authentication based on authentication information obtained from the party on the other end of connection (for example, the image forming apparatus 100) through near field wireless connection and provides the party on the other end of connection with an instruction on an operating mode. The near-field radio app 405 also starts a set app at the start of near-field wireless communication.

The printing app 406 is an app for enabling a device having a printing function on a network to perform the printing function.

The authentication printing app 407 is an app which instructs a device capable of performing authentication printing on a network to perform authentication printing. In authentication printing, data to which authentication data associated with a print job is added is sent to the device, and the device prompts input of authentication information to perform authentication and then perform printing.

The near-field wireless communication control unit 402 is a driver which controls the near-field wireless communication unit 206. The wireless LAN control unit 403 is a driver which controls the wireless communication unit 207.

Figure 5:
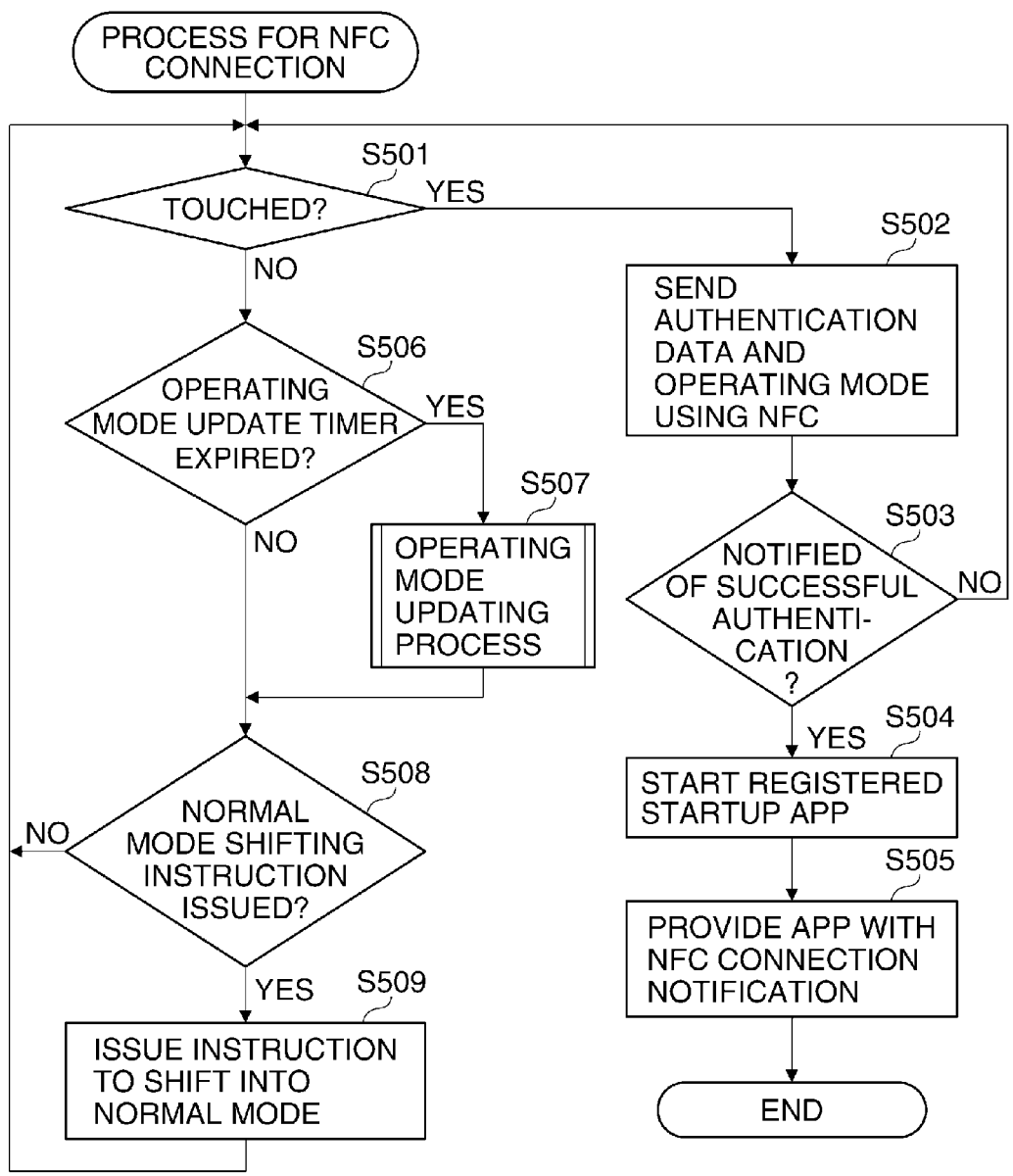
FIG. 5 is a flowchart showing an operating process carried out by the mobile information terminal at the start of near-field wireless communication.

FIG. 5 is a flowchart showing an operating process carried out by the mobile information terminal 200 at the start of near-field wireless communication. This process is implemented by the CPU 201 executing the near-field radio app 405.

In step S501, the CPU 201 determines whether or not a touching operation has been performed. Specifically, the CPU 201 determines whether or not the near field wireless communication unit 206 of the mobile information terminal 200 has been brought close to the image forming apparatus 100, and wireless communication using NFC has been started. When no touching operation has been performed, that is, when wireless communication using NFC has not been started, the process proceeds to step S506.

On the other hand, when a touching operation has been performed, that is, when wireless communication using NFC has been started, the process proceeds to step S502, in which the CPU 201 in turn causes the near-field wireless communication unit 206 to send authentication data and an operating mode to the near field wireless communication unit 110 of the image forming apparatus 100. The authentication data includes an ID and password data for use in accessing the image forming apparatus 100 from the mobile information terminal 200. The ID is a unique number associated with the mobile information terminal 200. The password data is a password indicating the validity of the ID.

The operating mode is information for use in bringing the image forming apparatus 100 into a predetermined operating state. In the present embodiment, there are four types of operating modes: "restriction mode", "scan mode" (job mode), "authentication mode", and "normal mode". Detailed description of these operating modes will be given later.

Then, in step S503, the CPU 201 determines whether or not authentication performed by the image forming apparatus 100 based on the authentication data sent in the step S502 is successful. When authentication is unsuccessful, the process returns to the step S501. On the other hand, when authentication is successful, a handover process for switching from near-field wireless communication using NFC to wireless communication using the wireless LAN is carried out using an IP address for wireless LAN connection, which is obtained from the image forming apparatus 100 using NFC. As a result, wireless communication between the mobile information terminal 200 and the image forming apparatus 100 using the wireless LAN is started. The CPU 201 then starts a startup app registered in advance (step S504), followed by the process proceeding to step S505. Description of how the startup app is registered will be given later.

In the step S505, the CPU 201 causes the near-field radio app 405 to give an NFC connection notification to other started apps. The NFC connection notification includes the IP address for wireless LAN connection obtained from the image forming apparatus 100 in the step S504. It should be noted that no other startup app is being executed in multitasking manner, the process directly returns to the step S501.

In the step S506, the CPU 201 judges whether or not an operating mode update timer has expired (i.e. whether or not a predetermined duration has been measured). The operating mode update timer is for adjusting the timing with which an operating mode updating process is carried out in the mobile information terminal 200. By periodically carrying out the operating mode updating process at relatively short time intervals, an operating mode suitable for startup statuses of apps in the mobile information terminal 200 is determined.

Upon judging in the step S506 that the operating mode update timer has expired, the CPU 201 carries out the operating mode updating process (step S507). Detailed description of the operating mode updating process will be given later with reference to FIG. 7.

In step S508, the CPU 201 judges whether or not it has received a normal mode shifting instruction from the operating unit 205. The normal mode shifting instruction is an instruction for shifting the image forming apparatus 100, which was shifted into a predetermined operating mode in the step S507, into the normal mode. Upon judging in the step S508 that the normal mode shifting instruction has been received, the CPU 201 controls the wireless communication unit 207 to send the normal mode shifting instruction to the image forming apparatus 100 via the wireless LAN (step S509), followed by the process returning to the step S501.

Figure 6:
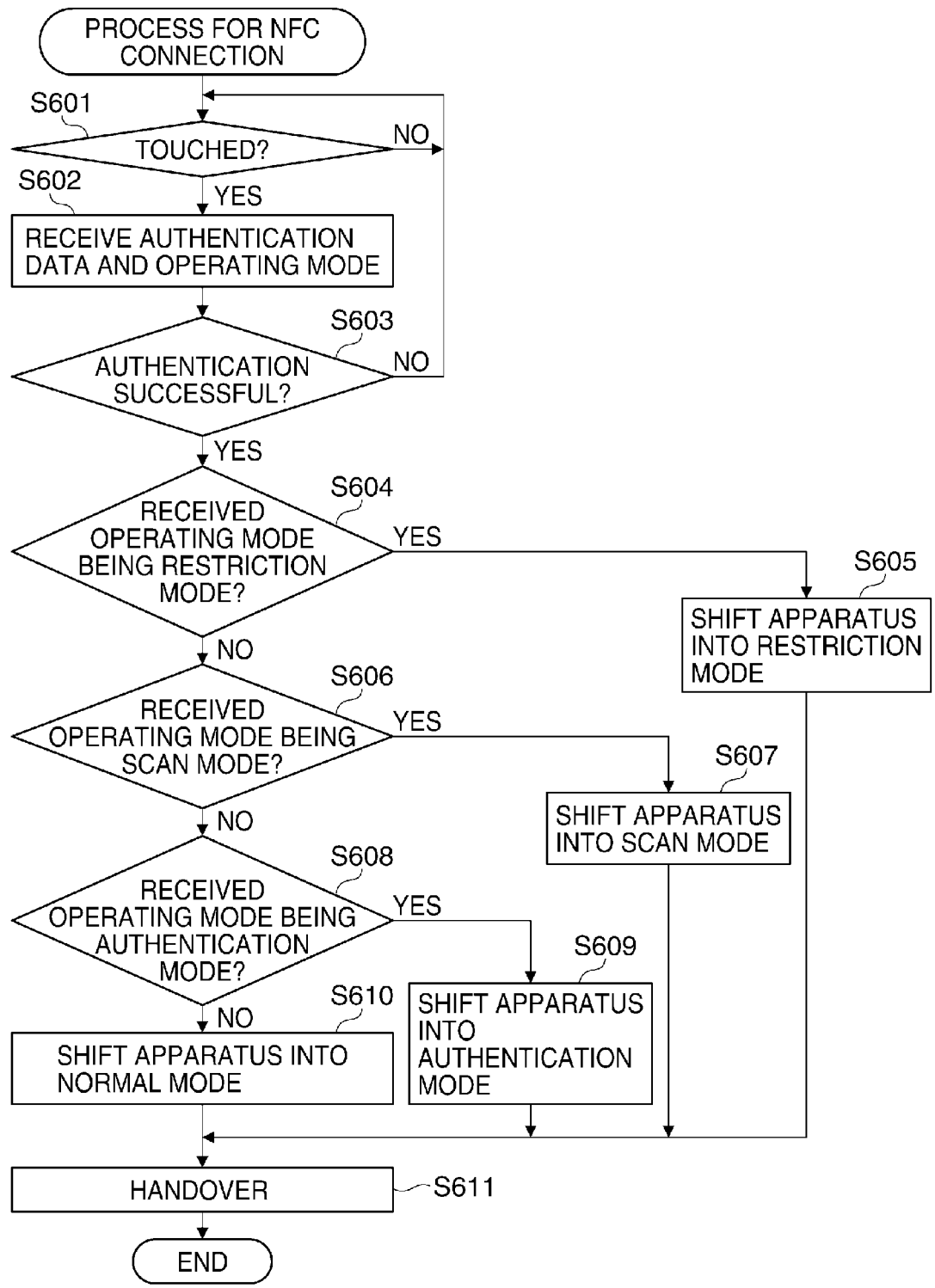
FIG. 6 is a flowchart showing an operating process carried out by the image forming apparatus at the start of near-field wireless communication.

FIG. 6 is a flowchart showing an operating process carried out by the image forming apparatus 100 at the start of near-field wireless communication. This process is implemented by the CPU 201 executing the near-field radio app 405.

In step S601, the CPU 101 judges whether or not a touching operation has been performed. Specifically, the CPU 101 judges whether or not the near-field wireless communication unit 206 of the mobile information terminal 200 has come close to the near-field wireless communication unit 110 of the image forming apparatus 100, and wireless communication using NFC has been started. When no touching operation has been performed, that is, when wireless communication using NFC has not been started, the CPU 101 carries out the process in the step S601 again.

On the other hand, when a touching operation has been performed, that is, when wireless communication using NFC has been started, the process proceeds to step S602, in which the CPU 101 in turn causes the near-field wireless communication unit 110 to receive authentication data and an operating mode from the near-field wireless communication unit 200 of the mobile information terminal 206. The authentication data and the operating mode are as described above.

Then, in step S603, the CPU 101 carries out an authentication process based on the received authentication data and judges whether or not authentication is successful. Specifically, the CPU 101 compares a combination of an ID and password data in the received authentication data with a combination of an ID and a password registered in advance and judges whether or not the ID and the password data in the received authentication data are valid.

When authentication is unsuccessful in the step S603, the present process is terminated, or the process returns to the step S601. On the other hand, when authentication is successful in the step S603, the CPU 101 judges whether or not the operating mode received in the step S602 is "restriction mode" (step S604). Upon judging that the operating mode is "restriction mode", the CPU 101 shifts the image forming apparatus 100 into the restriction mode (step S605), followed by the process proceeding to step S611.

Upon shifting into the restriction mode, the image forming apparatus 100 restricts user operation from the panel 106 and shifts into a state in which it gives priority to processing a print job from the mobile information terminal 200 of which wireless communication using NFC has been started. Detailed description of an operating process in the restriction mode will be given later.

Upon judging in the step S604 that the operation mode is not "restriction mode", the CPU 101 judges whether or not the operating mode received in the step S602 is "scan mode" (step S606). Upon judging that the operating mode is "scan mode", the CPU 101 shifts the image forming apparatus 100 into the scan mode (step S607), followed by the process proceeding to the step S611.

Upon shifting into the scan mode, the image forming apparatus 100 changes the display screen of the LCD 107 to a scan screen (not shown) and shifts into a state in which it gives priority to processing a scan job from the mobile information terminal 200 of which wireless communication using NFC has been started. Detailed description of an operating process in the scan mode will be given later.

Upon judging in the step S606 that the operation mode is not "scan mode", the CPU 101 judges whether or not the operating mode received in the step S602 is "authentication mode" (step S608). Upon judging that the operating mode is "authentication mode", the CPU 101 shifts the image forming apparatus 100 into the authentication mode (step S609), followed by the process proceeding to the step S611.

Upon shifting into the authentication mode, the image forming apparatus 100 changes the display screen of the LCD 107 to an authenticating operation screen (not shown) and shifts into a state of readiness to perform an authenticating operation. Detailed description of an operating process in the authentication mode will be given later.

Figure 15A:
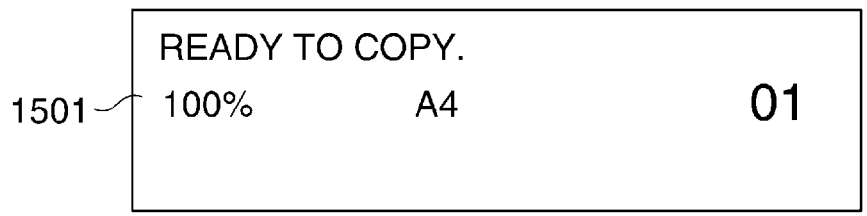

Upon judging in the step S608 that the operation mode is not "authentication mode", the CPU 101 shifts the image forming apparatus 100 into the normal mode (step S610), followed by the process proceeding to the step S611. Upon shifting into the normal mode, the image forming apparatus 100 changes the display screen of the LCD 107 to an initial screen 1501 shown in FIG. 15A and shifts into a normal operating state.

In the step S611, by means of an IP address for wireless LAN connection which is obtained from the image forming apparatus 100 using NFC, the CPU 101 carries out a handover process for switching from near-field wireless communication using NFC to wireless communication using the wireless LAN. As a result, wireless communication between the mobile information terminal 200 and the image forming apparatus 100 using the wireless LAN is started.

Figure 7:
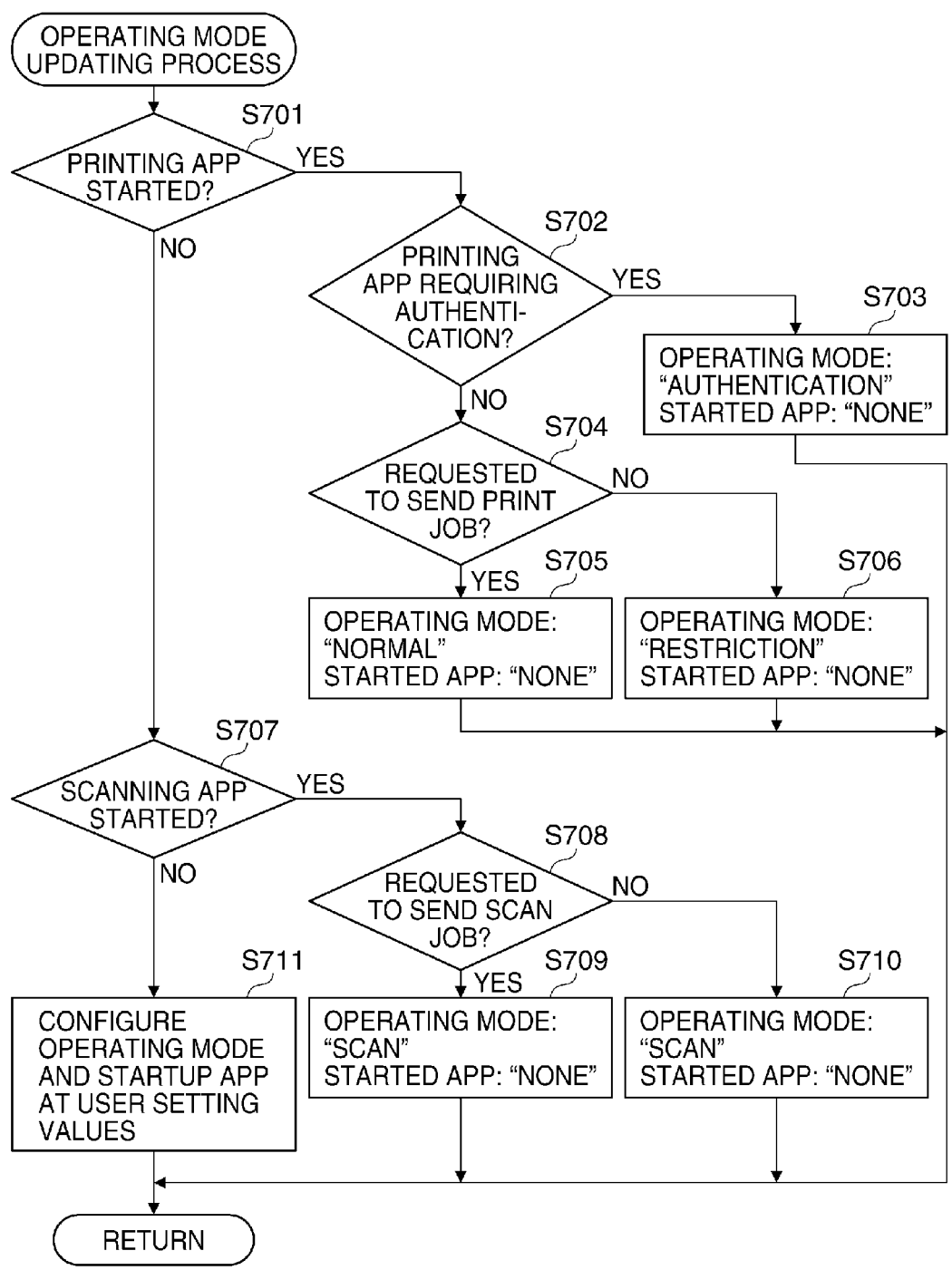
FIG. 7 is a flowchart showing in detail an operating mode updating process in step S507 in FIG. 5.

FIG. 7 is a flowchart showing in detail the operating mode updating process in the step S507 in FIG. 5.

In step S701, the CPU 201 judges whether or not a printing application has been started. This judgment is made based on the presence or absence of an app started flag which is stored in the RAM 202 on starting of the printing app 406 or the authentication printing app 407 (step S802 in FIG. 8, step S1002 in FIG. 10).

When it is judged in the step S701 that a printing application has not been started, the process proceeds to step S707. On the other hand, upon judging in the step S701 that a printing application has been started, the CPU 201 judges whether or not the started printing application is the authentication printing app 407 (step S702). Upon receiving a print job with an authentication code, the image forming apparatus 100 executes the print job when a user inputs an authentication code which matches the authentication code added to the print job.

When it is judged in the step S702 that the started printing application is the authentication printing app 407, the process proceeds to step S703, in which the CPU 201 in turn configures an operating mode at "authentication mode", and configures started apps at "none". The reason why an operating mode is configured at "authentication mode" is that a job which requires authentication is likely to be submitted, and in this case, the image forming apparatus 100 needs to be immediately shifted into a state of readiness to accept an authenticating operation.

On the other hand, when it is judged in the step S702 that the started printing application is not the authentication printing app 407, the process proceeds to step S704, in which the CPU 201 in turn judges whether or not a request to send a print job of which a destination is the image forming apparatus 100 has been issued from the printing app 406. As a result of this judgment, when a request to send a print job has been issued, the process proceeds to step S705, in which the CPU 201 in turn configures the operating mode at "normal mode", and configures started apps at "none".

The reason why the operating mode is configured at "normal mode" is that in response to the request to send the print from the printing app 406, the print job is immediately sent to the image forming apparatus 100, and hence there is no need to restrict user operation on the image forming apparatus 100.

On the other hand, when it is judged in the step S704 that no request to send a print job of which a destination is the image forming apparatus 100 has been issued from the printing app 406, the process proceeds to step S706, in which the CPU 201 in turn configures the operating mode at "restriction mode", and configures started apps at "none". The reason why the operating mode is configured at "restriction mode" is that a request to send a print job is likely to be issued from the printing app 406, and hence it is necessary to restrict the use of the image forming apparatus 100 by other users.

In step S707, the CPU 201 judges whether or not a scanning application has not been started. This judgment is made based on the presence or absence of an app started flag which is stored in the RAM 202 when the scanning app 404 is started (step S902 in FIG. 9).

When it is judged in the step S707 that a scanning application has not been started, the process proceeds to step S711. On the other hand, when it is judged in the step S707 that a scanning application has been started, the CPU 201 in turn judges whether or not a request to send a scan job of which a destination is the image forming apparatus 100 has been issued from the scanning app 404 (step S708). As a result of this judgment, when a request to send a scan job has been issued, the CPU 201 configures the operating mode at "scan mode" and configures started apps at "none" (step S709).

The reason why the operating mode is configured at "scan mode" is that in order to immediately start a scan job in response to a scan job sending request from the scanning app 404, the image forming apparatus 100 needs to be shifted in advance into a state of readiness to start a scan job.

Upon judging in the step S708 that no request to send a scan job of which a destination is the image forming apparatus 100 has been issued from the scanning app 404, the CPU 202 configures the operating mode at "scan mode", and configures started apps at "none" (step S710). It should be noted that although in both the step S709 and the step S710, the "operating mode" is configured at the scan mode, the "operating mode" may be configured at other scan modes in which display screens and operation restrictions of the image forming apparatus 100 are different. Also, in the step S709, the operating mode may be configured at "normal mode".

Figure 11:
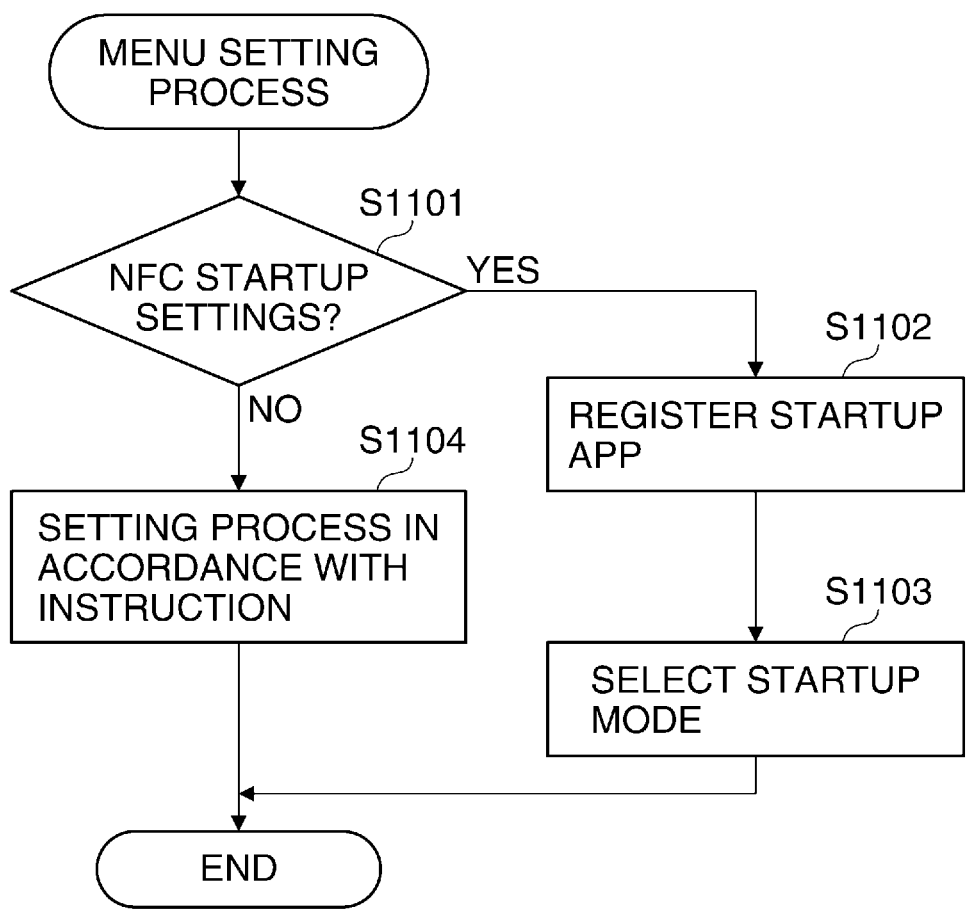
FIG. 11 is a flowchart showing a menu setting process which is carried out by executing a near-field radio app.

In step S711, the CPU 201 sets user setting values for the operating mode and the started app and terminates the present process. The user setting values are default settings for the operating mode and the started app, which are registered when a menu setting process in FIG. 11 is carried out by the near-field radio app 405.

As described above, operation modes are changed according to types of apps that have been started in the information mobile terminal 200. When near-field wireless communication using NFC is started in a case where no app has been started in the information mobile terminal 200, an app set in advance by the user is started to shift the image forming apparatus 100 into an operating mode set in advance.

A description will now be given of operating processes for the printing app 406, the scanning app 404, and the authentication printing app 407 in the mobile information terminal 200.

Figure 8:
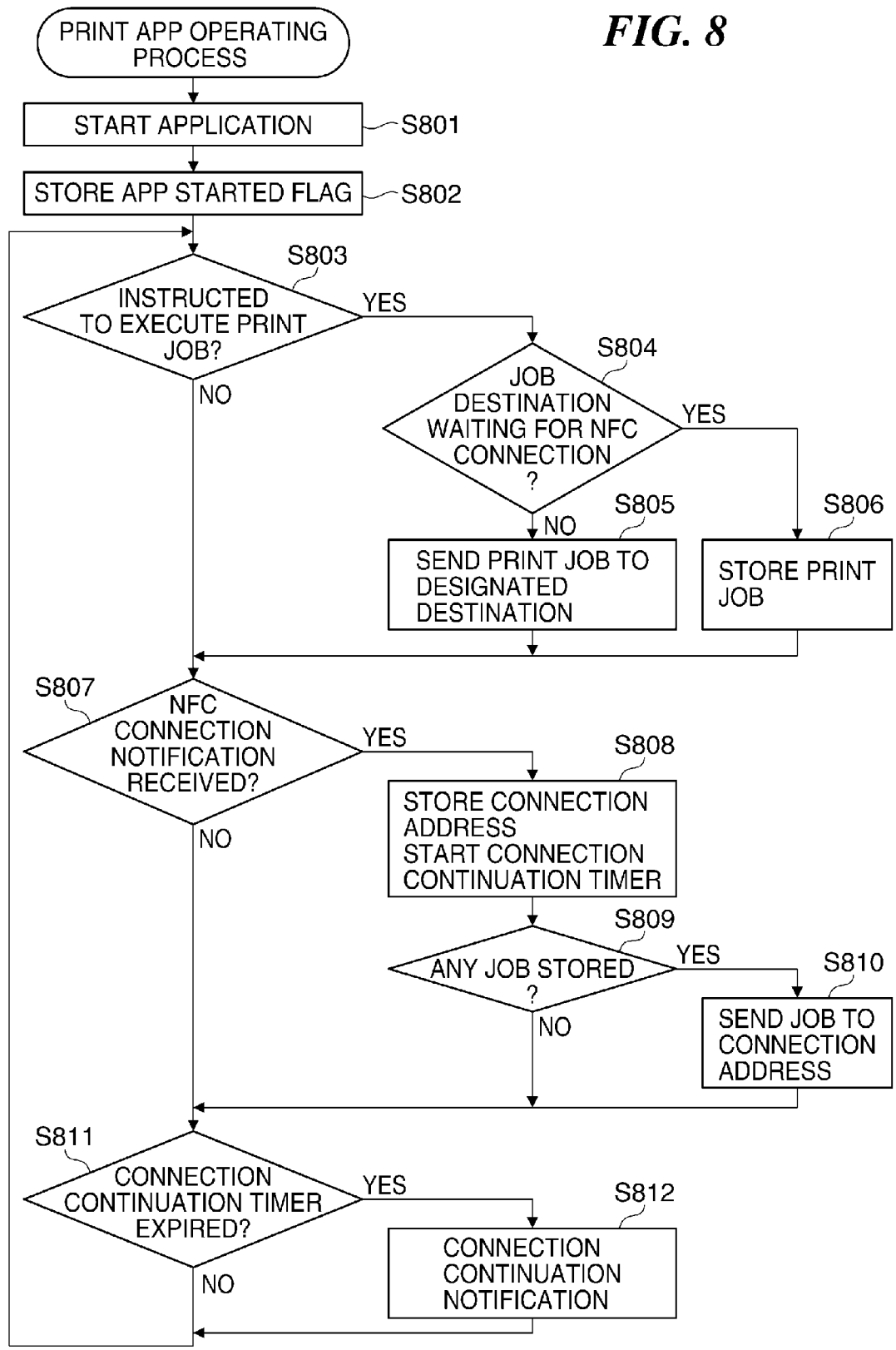
FIG. 8 is a flowchart showing an operating process for a printing app.

FIG. 8 is a flowchart showing an operating process for the printing app 406. This process is implemented by the CPU 201 executing the printing app 406.

In step S801, the CPU 201 starts the printing app 406 in response to user operation on the operating unit 205 or the like (application startup). Then, in step S802, the CPU 201 stores, in the RAM 202, an app started flag indicating that the printing app 406 has already been started.

In step S803, the CPU 201 judges whether or not it has received an instruction to execute a print job in response to user operation on the operating unit 205 or the like. When the CPU 201 has received an instruction to execute a print job, it judges whether or not a transmission destination of the print job (here, the image forming apparatus 100) is configured to wait for an instruction using NFC (step S804). The printing app 406 normally designates a printer as a transmission destination of a print job, but is allowed to issue a job executing instruction in accordance with a touch operation which is a trigger for NFC.

When in the step S804, the transmission destination of the print job is configured to wait for an instruction using NFC, the CPU 201 stores, in the RAM 202, a flag indicating that a job executing instruction has been issued by a touching operation, which is a trigger for NFC, as well as the print job (step S806). On the other hand, when in the step S804, the transmission destination of the print job is not configured to wait for an instruction using NFC, the CPU 201 transmits the print job to the designated transmission destination (step S805).

When in the step S803, the CPU 201 has received no instruction to execute a print job, the process proceeds to step S807, in which the CPU 201 in turn judges whether or not an NFC connection notification has been received by the printing app 406 using the near-field radio app 405. An NFC connection notification is provided when connection for near-field wireless communication by a touching operation is started (the step S505 in FIG. 5).

When in the step S807, no NFC connection notification has been received, the process proceeds to step S811. On the other hand, when an NFC connection notification has been received, the process proceeds to step S808, in which the CPU 201 in turn stores, in the RAM 202, an IP address for wireless LAN connection, which is included in the NFC connection notification, and starts a connection continuation timer. After a near-field wireless communication using NFC is started, the connection continuation timer periodically notifies the party at the other end that the near-field wireless communication continues.

Then, in step S809, the CPU 201 judges whether or not a print job is stored in the RAM 202. When a print job is stored in the RAM 202, the CPU 201 sends the print job to the IP address for wireless LAN connection, which was stored in the RAM 202 in the step S808 (step S810), followed by the process proceeding to the step S811. On the other hand, when in the step S809, no print job is stored in the RAM 202, the process directly proceeds to the step S811.

In the step S811, the CPU 201 judges whether or not the connection continuation timer started in the step S808 has expired. Upon judging that the connection continuation timer has expired, the CPU 201 sends a connection continuation notification command to the IP address for wireless LAN connection (step S812), followed by the process returning to the step S803.

Figure 9:
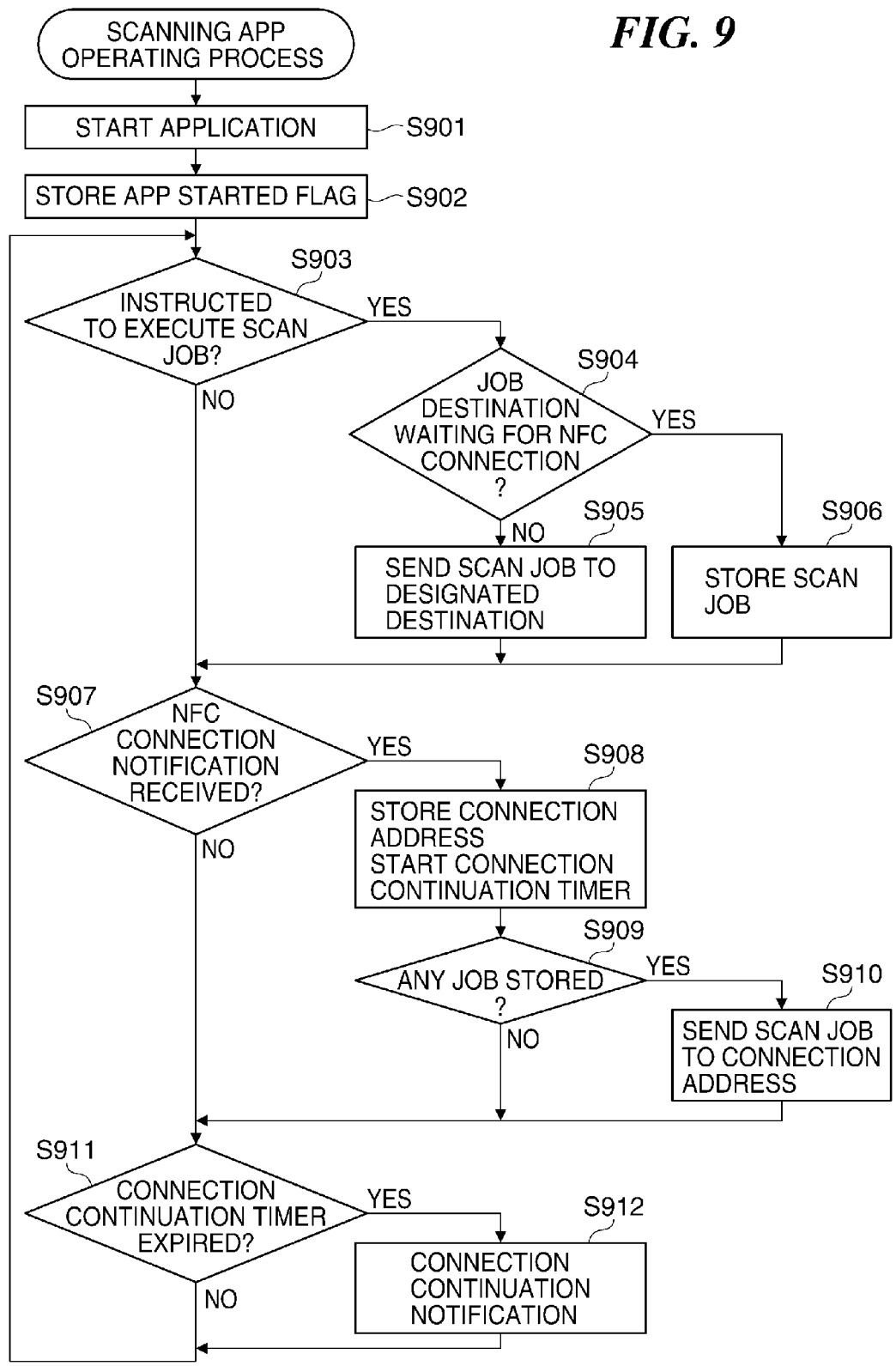
FIG. 9 is a flowchart showing an operating process for a scanning app.

FIG. 9 is a flowchart showing an operating process for the scanning app 404. This process is implemented by the CPU 101 executing the scanning app 404.

In step S901, the CPU 201 starts the scanning app 404 in response to user operation on the operating unit 205 or the like (application startup). Then, in step S902, the CPU 201 stores, in the RAM 202, an app started flag indicating that the scanning app 404 has already been started.

In step S903, the CPU 201 judges whether or not it has received an instruction to execute a scan job in response to user operation on the operating unit 205 or the like. When the CPU 201 has received an instruction to execute a scan job, it judges whether or not a transmission destination of the scan job (here, the image forming apparatus 100) is configured to wait for an instruction using NFC (step S904). The scanning app 404 normally designates a scanner, a multifunctional peripheral, or the like as a transmission destination of a scan job, but is allowed to issue a job executing instruction in accordance with a touch operation which is a trigger for NFC.

When in the step S904, the transmission destination of the scan job is configured to wait for an instruction using NFC, the CPU 201 stores, in the RAM 202, a flag indicating that a job executing instruction has been issued by a touching operation, which is a trigger for NFC, as well as the scan job (step S906). On the other hand, when in the step S904, the transmission destination of the scan job is not configured to wait for an instruction using NFC, the CPU 201 transmits the scan job to the designated transmission destination and receives image data (step S905).

When the CPU 201 judges in the step S903 that it has received no instruction to execute a scan job, it judges in step S907 whether or not an NFC connection notification has been received by the scanning app 404 using the near-field radio app 405. An NFC connection notification is provided when connection for near-field wireless communication by a touching operation is started (see the step S505 in FIG. 5).

When in the step S907, no NFC connection notification has been received, the process proceeds to step S911. On the other hand, when an NFC connection notification has been received, the process proceeds to step S908, in which the CPU 201 in turn stores, in the RAM 202, an IP address for wireless LAN connection, which is included in the NFC connection notification, and starts a connection continuation timer. After a near-field wireless communication using NFC is started, the connection continuation timer periodically notifies the party at the other end that the near-field wireless communication continues.

Then, in step S909, the CPU 201 judges whether or not a scan job is stored in the RAM 202. When a scan job is stored in the RAM 202, the CPU 201 sends the scan job to the IP address for wireless LAN connection, which was stored in the RAM 202 in the step S908 (step S910), followed by the process proceeding to the step S911. On the other hand, when in the step S909, no print job is stored in the RAM 202, the process directly proceeds to the step S911.

In the step S911, the CPU 201 judges whether or not the connection continuation timer started in the step S908 has expired. Upon judging that the connection continuation timer has expired, the CPU 201 sends a connection continuation notification command to the IP address for wireless LAN connection (step S912), followed by the process returning to the step S903.

Figure 10:
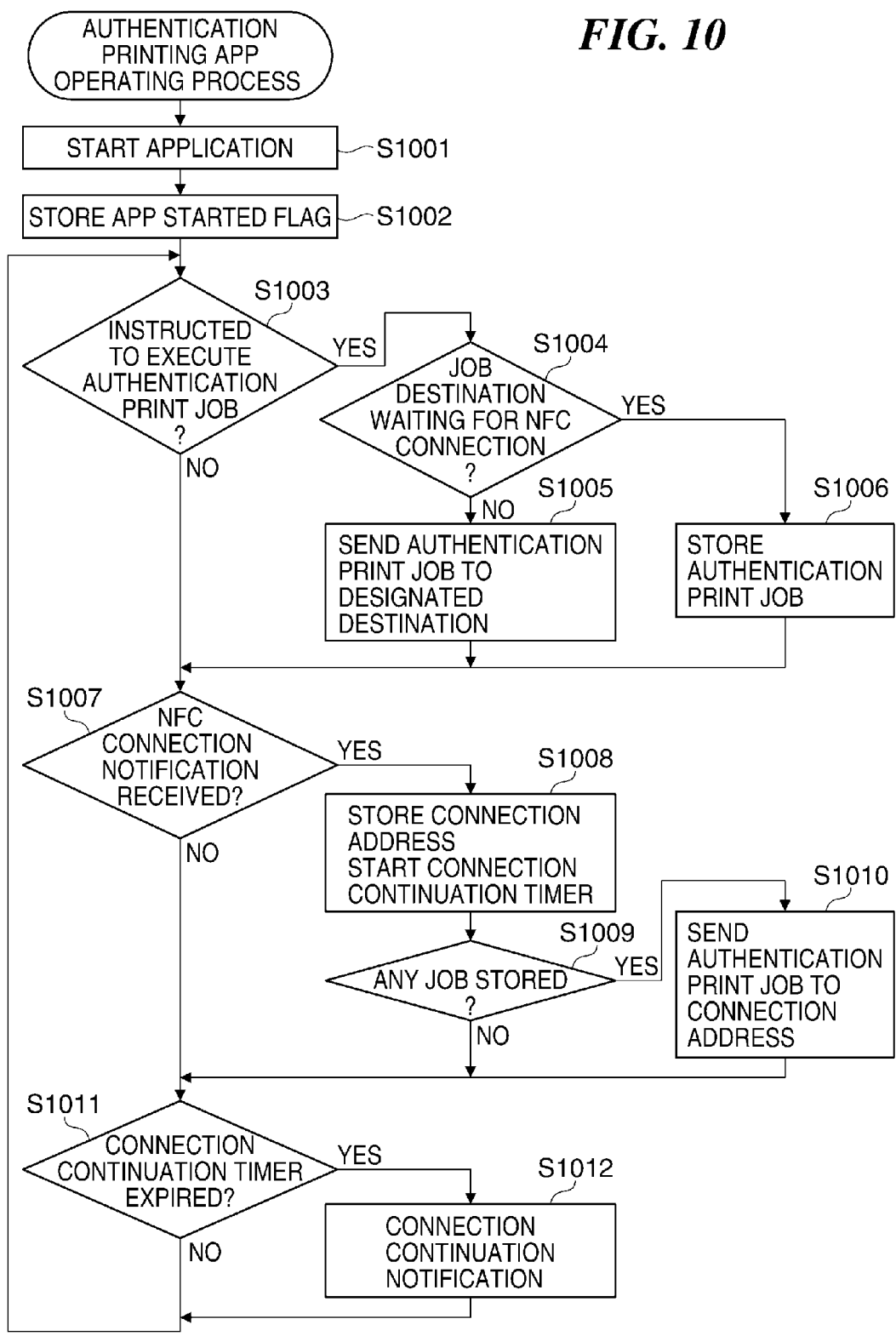
FIG. 10 is a flowchart showing an operating process for an authentication printing app.

FIG. 10 is a flowchart showing an operating process for the authentication printing app 407. This process is implemented by the CPU 201 executing the authentication printing app 407.

In step S1001, the CPU 201 starts the authentication printing app 407 in response to user operation on the operating unit 205 or the like (application startup). Then, in step S1002, the CPU 201 stores, in the RAM 202, an app started flag indicating that the authentication printing app 407 has already been started.

In step S1003, the CPU 201 judges whether or not it has received an instruction to execute an authentication print job in response to user operation on the operating unit 205 or the like. When the CPU 201 has received an instruction to execute an authentication print job, it judges whether or not a transmission destination of the authentication print job (here, the image forming apparatus 100) is configured to wait for an instruction using NFC (step S1004).

The authentication printing app 407 is allowed to designate a predetermined printer as a transmission destination of an authentication print job. Here, the authentication printing app 407 is allowed to issue a job executing instruction in accordance with a touch operation which is a trigger for NFC and hence checks whether or not the submitted authentication print job is an authentication print job for the image forming apparatus 100 which is touched.

When in the step S1004, the transmission destination of the authentication print job is configured to wait for an instruction using NFC, the process proceeds to step S1006. In the step S1006, the CPU 201 stores, in the RAM 202, a flag indicating that a job executing instruction has been issued by a touching operation, which is a trigger for NFC, as well as the authentication print job. On the other hand, when in the step S1004, the transmission destination of the authentication print job is not configured to wait for an instruction using NFC, the process proceeds to step S1005, in which the CPU 201 in turn transmits the authentication print job to the designated transmission destination.

When in the step S1003, the CPU 201 has received no instruction to execute an authentication print job, the process proceeds to step S1007, in which the CPU 201 in turn judges whether or not an NFC connection notification has been received by the authentication printing app 407 using the near-field radio app 405. An NFC connection notification is provided when connection for near-field wireless communication by a touching operation is started (see the step S505 in FIG. 5).

When in the step S1007, no NFC connection notification has been received, the process proceeds to step S1011. On the other hand, when an NFC connection notification has been received, the process proceeds to step S1008, in which the CPU 201 in turn stores, in the RAM 202, an IP address for wireless LAN connection, which is included in the NFC connection notification, and starts a connection continuation timer. After a near-field wireless communication using NFC is started, the connection continuation timer periodically notifies the party at the other end that the near-field wireless communication continues.

Then, in step S1009, the CPU 201 judges whether or not an authentication print job is stored in the RAM 202. When an authentication print job is stored in the RAM 202, the CPU 201 sends the authentication print job to the IP address for wireless LAN connection, which was stored in the RAM 202 in the step S1008 (step S1010), followed by the process proceeding to the step S1011. On the other hand, when in the step S1009, no authentication print job is stored in the RAM 202, the process directly proceeds to the step S1011.

In the step S1011, the CPU 201 judges whether or not the connection continuation timer started in the step S1008 has expired. Upon judging that the connection continuation timer has expired, the CPU 201 sends a connection continuation notification command to the IP address for wireless LAN connection (step S1012), followed by the process returning to the step S1003.

FIG. 11 is a flowchart showing a menu setting process which is carried out by executing the near-field radio app 405. This process is implemented by the CPU 201 executing the near-field radio app 405.

In step S1101, the CPU 201 judges whether or not it has received startup settings for the start of near-field wireless communication via the operating unit 205 or the like. When the CPU 201 has received startup settings, it registers, as a startup app, an app which is to be started in synchronization with the start of near-field wireless communication using NFC in response to a touching operation. Specifically, the CPU 201 displays, on the display unit 204, a list of apps which the mobile information terminal 200 has, and accepts designation of a startup app from the user via the operating unit 205. Information on the registered startup app is stored in the HDD 203.

Then, in step S1103, when near-field wireless communication with the image forming apparatus 100 using NFC is started, the CPU 201 stores, in the HDD 203, an operating mode of which the image forming apparatus 100 is to be notified. Specifically, the CPU 201 displays "restriction mode", "scan mode", "authentication mode", and "normal mode" on the display unit 204 and accepts designation of an operating mode from the user via the operating unit 205. The startup app stored in the step S1102 and the operating mode stored in the step S1103 are set as user setting values in the step S711 in FIG. 7.

On the other hand, when in the step S1101, no startup settings for the start of near-field wireless communication have been received, the process proceeds to step S1104, in which the CPU 201 in turn carries out a registration process according to specified settings and terminates the present process.

A description will now be given of the restriction mode, the scan mode, and the authentication mode in the image forming apparatus 100.

Figure 12:
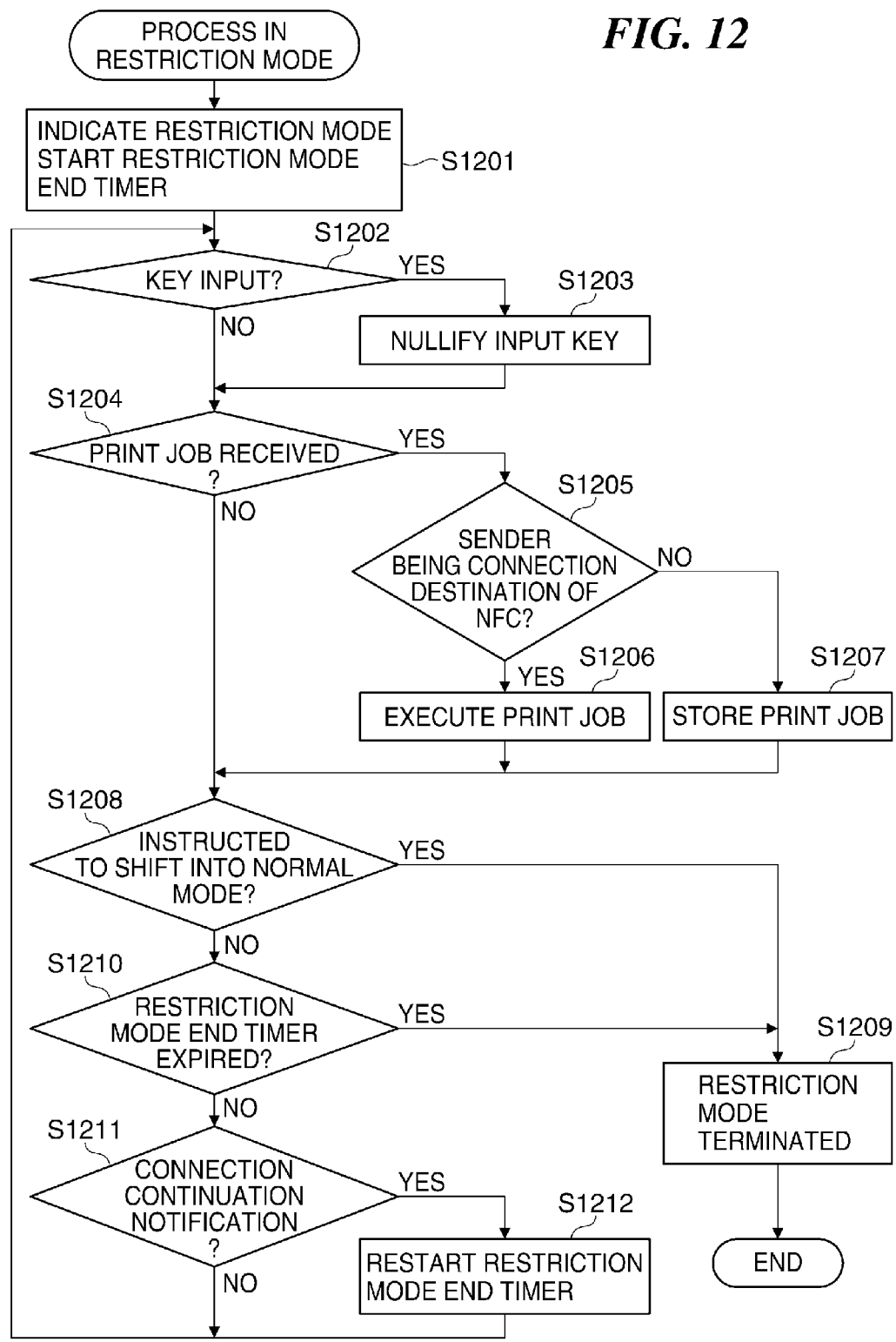
FIG. 12 is a flowchart showing a process which is carried out when the image forming apparatus is placed in a restriction mode.

FIG. 12 is a flowchart showing a process which is carried out when the image forming apparatus 100 is placed in the restriction mode. This process is implemented by the CPU 101 executing a control program read out from the ROM 102 or the like.

Figure 15B:
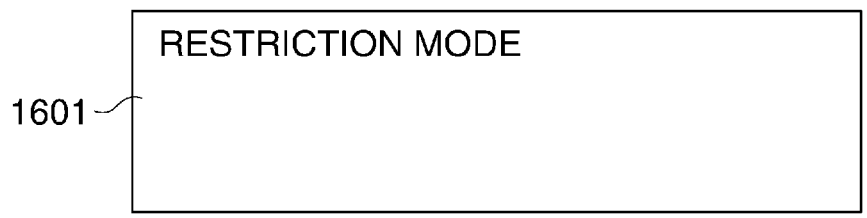

In step S1201, as shown in FIG. 15B, the CPU 101 switches the display screen of the LCD 107 to a restriction mode screen 1601 indicating that the image forming apparatus 100 is placed in the restriction mode, and starts a restriction mode end timer. The restriction mode end timer is used to, when the image forming apparatus 100 is run in an operating mode other than the normal mode, monitor connection continuation notifications from the mobile information terminal 200 and determine whether or not to maintain a restricted operating mode (restriction mode, scan mode, authentication mode).

In step S1202, the CPU 101 judges whether or not there has been a key input on the panel 106. When there has been a key input, the process proceeds to step S1203, in which the CPU 101 in turn nullifies the input key without carrying out a process corresponding to the key input in the step S1203. Thus, in the restriction mode, the CPU 101 does not respond to operations from the panel 106 and deals with print jobs from the mobile information terminal 200 which is the party at the other end.

In step S1204, the CPU 101 judges whether or not it has received a print job via the wireless communication unit 105. When the CPU 101 has received a print job, it judges whether or not a sender of the print job is an apparatus connected by near-field wireless communication using NFC (here, the mobile information terminal 200). For this judgment, an IP address for connection which is sent from the sender of the print job is used.

When in the step S1205, the sender of the print job is an apparatus connected by near-field wireless communication using NFC, the CPU 101 executes the print job received in the step S1206 and causes the printer 108 to produce a printout. On the other hand, when in the step S1205, the sender of the print job is not an apparatus connected by near-field wireless communication using NFC, the process proceeds to step S1207, in which the CPU 101 in turn stores data on the received print job in the RAM 103. As a result, priority is given to a print job from the mobile information terminal 200 of which connection through near field wireless communication by a touching operation has been started.

When in the step S1204, the CPU 101 has received no print job, the process proceeds to step S1208, in which the CPU 101 in turn judges whether or not it has received a normal mode shifting instruction from the mobile information terminal 200. When the CPU 101 has received a normal mode shifting instruction, the process proceeds to step S1209, in which the CPU 101 in turn brings the restriction mode to an end and shifts into the normal mode in which there is no restriction.

When in the step S1208, the CPU 101 has received no normal mode shifting instruction from the mobile information terminal 200, the process proceeds to step S1210, in which the CPU 101 in turn judges whether or not the restriction mode end timer started in the step S1201 has expired. When the restriction mode end timer has expired, the process proceeds to the step S1209, in which the CPU 101 in turn brings the restriction mode to an end and shifts into the normal mode.

On the other hand, when in the step S1210, the restriction mode end timer has not expired, the process proceeds to step S1211, in which the CPU 101 in turn judges whether or not it has received a connection continuation notification from the mobile information terminal 200. When the CPU 101 has received a connection continuation notification, it restarts the restriction mode end timer in step S1212. Specifically, in response to a connection continuation request from the mobile information terminal 200, the CPU 101 initializes the timer for use in determining whether or not connection has ended.

Figure 13:
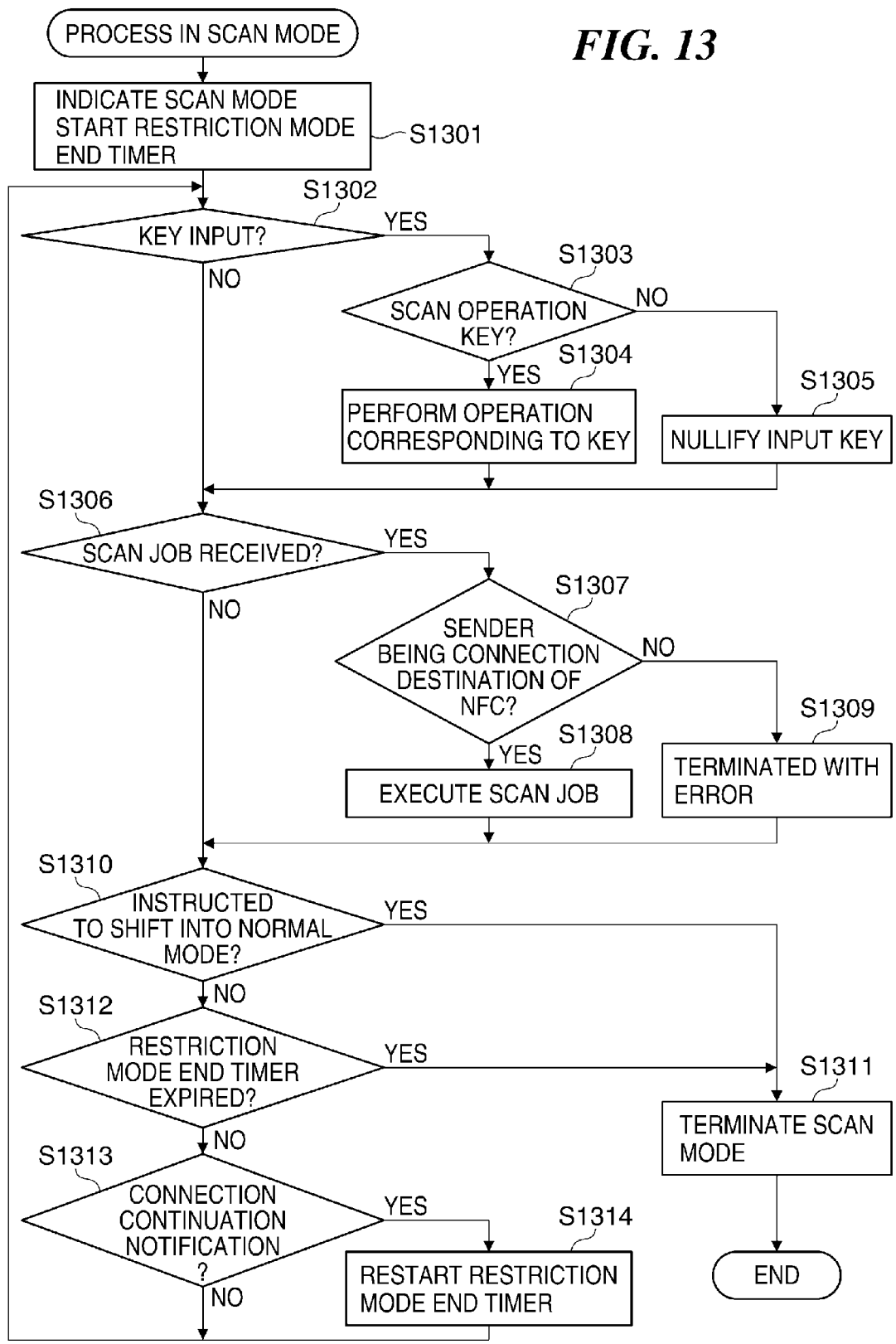
FIG. 13 is a flowchart showing a process which is carried out when the image forming apparatus is placed in a scan mode.

FIG. 13 is a flowchart showing a process which is carried out when the image forming apparatus 100 is placed in the scan mode. This process is implemented by the CPU 101 executing a control program read out from the ROM 102 or the like.

Figure 15C:
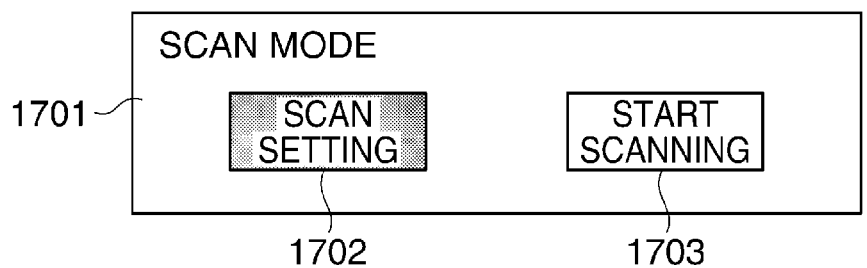

In step S1301, as shown in FIG. 15C, the CPU 101 switches the display screen of the LCD 107 to a scan mode screen 1701 indicating that the image forming apparatus 100 is placed in the scan mode. A scan setting button 1702 and a scan start button 1703 are placed on the scan mode screen 1701. When the scan setting button 1702 is selected, a menu (not shown) for setting an image quality, a color mode, and so on for scanning at the image forming apparatus 100 side is displayed. When the scan start button 1703 is selected, the image forming apparatus 100 starts scanning. In the step S1301, the CPU 101 also starts the restriction mode end timer.

In step S1302, the CPU 101 judges whether or not there has been a key input on the panel 106. When there has been a key input, the process proceeds to step S1303, in which the CPU 101 in turn judges whether or not the input key is related to a scanning operation. Thus, in the scan mode, the CPU 101 accepts only scanning-related operations from the panel 106.

When the input key is related to a scanning operation, the process proceeds to step S1304, in which the CPU 101 in turn performs an operation corresponding to the input key. On the other hand, when the input key is not related to a scanning operation, the process proceeds to step S1305, in which the CPU 101 nullifies the input key and does not perform an operation corresponding to the input key.

In step S1306, the CPU 101 judges whether or not it has received a scan job via the wireless communication unit 105. When the CPU 101 has received a scan job, the process proceeds to step S1307, in which the CPU 101 judges whether or not a sender of the scan job is an apparatus connected by near-field wireless communication using NFC (here, the mobile information terminal 200). For this judgment, an IP address for connection which is sent from the sender of the scan job is used.

When in the step S1307, the sender of the scan job is an apparatus connected by near-field wireless communication using NFC, the process proceeds to step S1308. In the step S1308, the CPU 101 executes the received scan job, causes the scanner 109 to read an original, and sends image data obtained as a result of conversion performed by the image processing unit 104 to the mobile information terminal 200.

On the other hand, when in the step S1306, the sender of the scan job is not an apparatus connected by near-field wireless communication using NFC, the process proceeds to step S1309, in which the CPU 101 in turn terminates the scan job with error. As a result, priority is given to a scan job from the mobile information terminal 200 of which connection through near-field wireless communication by a touching operation has been started.

When in the step S1306, the CPU 101 has received no scan job, the process proceeds to step S1310, in which the CPU 101 in turn judges whether or not it has received a normal mode shifting instruction from the mobile information terminal 200. When the CPU 101 has received a normal mode shifting instruction, the process proceeds to step S1311, in which the CPU 101 in turn brings the scan mode to an end and shifts into the normal mode in which there is no restriction.

When in the step S1310, the CPU 101 has received no normal mode shifting instruction from the mobile information terminal 200, the process proceeds to step S1312, in which the CPU 101 in turn judges whether or not the restriction mode end timer started in the step S1301 has expired. When the restriction mode end timer has expired, the process proceeds to the step S1311, in which the CPU 101 in turn brings the scan mode to an end and shifts into the normal mode.

On the other hand, when in the step S1312, the restriction mode end timer has not expired, the process proceeds to step S1313, in which the CPU 101 in turn judges whether or not it has received a connection continuation notification from the mobile information terminal 200. When the CPU 101 has received a connection continuation notification, the CPU 101 restarts the restriction mode end timer in step S1314. Specifically, in response to a connection continuation request from the mobile information terminal 200, the CPU 101 initializes the timer for use in determining whether or not connection has ended.

Figure 14:
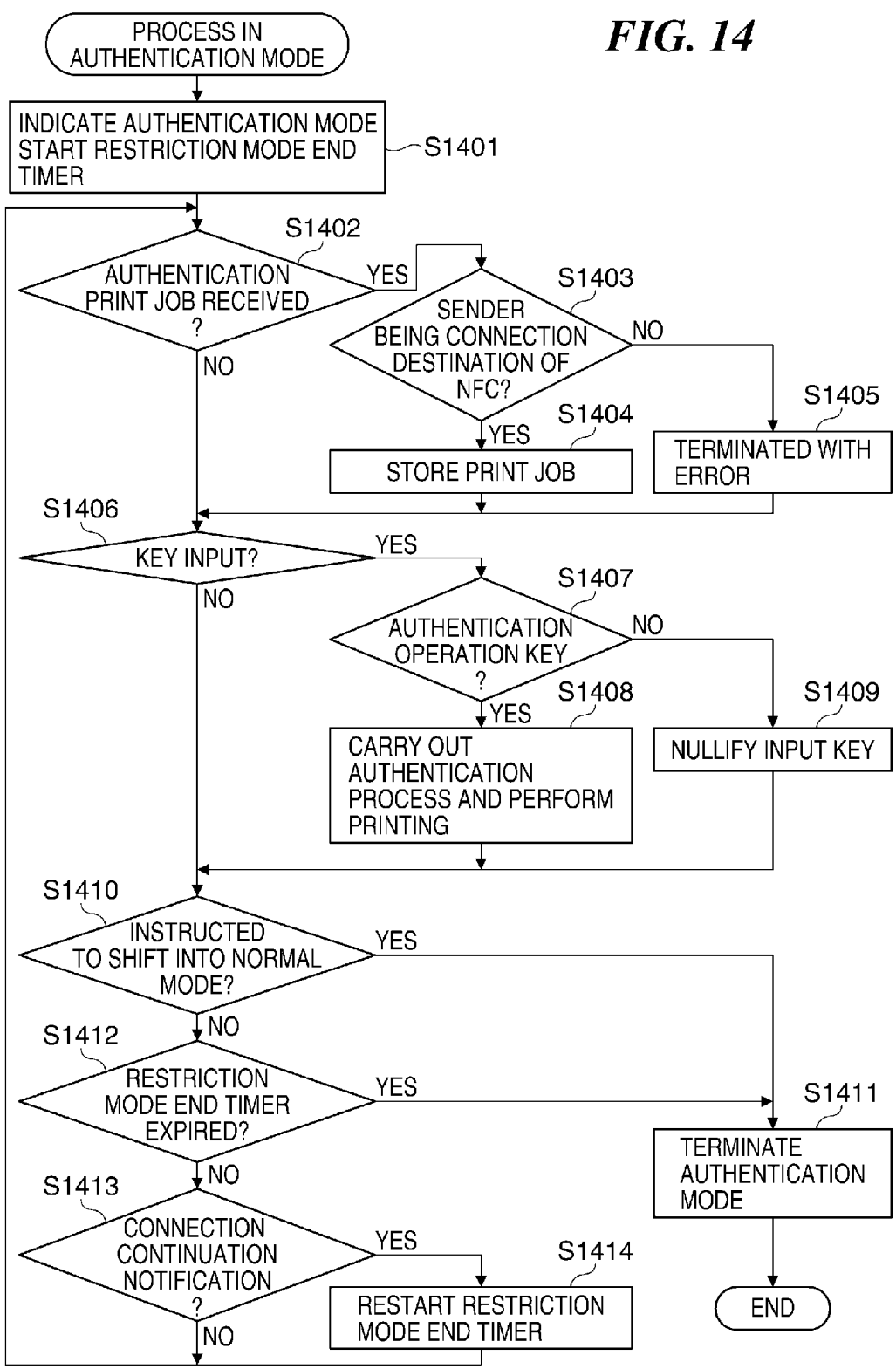
FIG. 14 is a flowchart showing a process which is carried out when the image forming apparatus is placed in an authentication mode.

FIG. 14 is a flowchart showing a process which is carried out when the image forming apparatus 100 is placed in the authentication mode. This process is implemented by the CPU 101 executing a control program read out from the ROM 102 or the like.

Figure 15D:
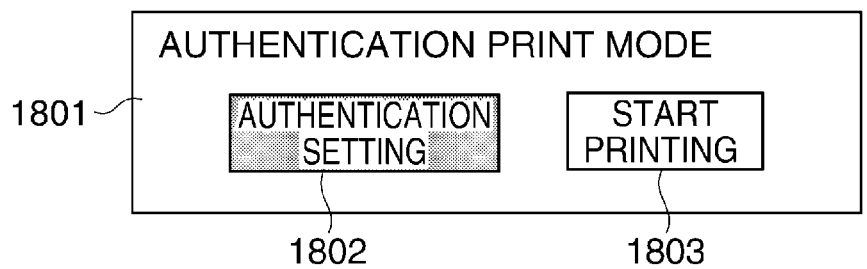

In step S1401, as shown in FIG. 15D, the CPU 101 switches the display screen of the LCD 107 to an authentication mode screen 1801 indicating that the image forming apparatus 100 is placed in the authentication mode. An authentication setting button 1802 and a print start button 1803 are placed on the authentication mode screen 1801. When the authentication setting button 1802 is selected, the screen switches to a screen on which an authentication code for authentication printing is entered (not shown). When the print start button 1703 is selected, the image forming apparatus 100 starts executing an authentication print job. In the step S1401, the CPU 101 also starts the restriction mode end timer.

In step S1402, the CPU 101 judges whether or not it has received an authentication print job via the wireless communication unit 105. When the CPU 101 has received an authentication print job, the process proceeds to step S1403, in which the CPU 101 in turn judges whether or not a sender of the authentication print job is an apparatus connected by near-field wireless communication using NFC (here, the mobile information terminal 200). For this judgment, an IP address for connection which is sent from the sender of the authentication print job is used.

When in the step S1403, the sender of the authentication print job is an apparatus connected by near-field wireless communication using NFC, the process proceeds to step S1404, in which the CPU 101 in turn stores the received authentication print job in the RAM 103. On the other hand, when in the step S1403, the sender of the authentication print job is not an apparatus connected by near-field wireless communication using NFC, the process proceeds to step S1405, in which the CPU 101 in turn terminates the scan job with error. When in the step S1402, the CPU 101 has received no authentication print job, the process proceeds to step S1406.

In the step S1406, the CPU 101 judges whether or not there has been a key input on the panel 106. When there has been a key input, the process proceeds to step S1407, in which the CPU 101 in turn judges whether or not the input key is related to an authenticating operation. When the input key is related to an authenticating operation, and authentication is successfully performed in step S1408, the CPU 101 executes the print job and causes the printer 108 to produce a printout.

When in the step S1407, the input key is not related to an authenticating operation, the process proceeds to step S1409, in which the CPU 101 in turn nullifies the input key. Thus, in the authentication mode, operations from the operating unit are restricted to only authenticating operations.

When in the step S1406, there has no key input on the panel 106, the process proceeds to step S1410, in which the CPU 101 in turn judges whether or not it has received a normal mode shifting instruction from the mobile information terminal 200. When the CPU 101 has received a normal mode shifting instruction, the process proceeds to step S1411, in which the CPU 101 in turn brings the authentication mode to an end and shifts into the normal mode in which there is no restriction.

When in the step S1410, the CPU 101 has received no normal mode shifting instruction from the mobile information terminal 200, the process proceeds to step S1412, in which the CPU 101 in turn judges whether or not the restriction mode end timer started in the step S1401 has expired. When the restriction mode end timer has expired, the process proceeds to the step S1411, in which the CPU 101 in turn brings the authentication mode to an end and shifts into the normal mode.

On the other hand, when in the step S1412, the restriction mode end timer has not expired, the process proceeds to step S1413, in which the CPU 101 in turn judges whether or not it has received a connection continuation notification from the mobile information terminal 200. When the CPU 101 has received a connection continuation notification, the CPU 101 restarts the restriction mode end timer in step S1414. Specifically, in response to a connection continuation request from the mobile information terminal 200, the CPU 101 initializes the timer for use in determining whether or not connection has ended.

As described above, the image forming apparatus obtains authentication data from the mobile information terminal through near-field wireless communication and performs user authentication based on the obtained authentication data. When user authentication is successful, the image forming apparatus shifts into an operating mode corresponding to an application running in the mobile information terminal. Since the operating mode of the image forming apparatus is allowed to be changed according to an application running in the mobile information terminal of which near-field wireless communication has been started, priority is given to execution of a job by the image forming apparatus which is sent by the application that has been started in the mobile information terminal. Moreover, when user authentication using near-field wireless communication is successful while the scanning application is running in the mobile information terminal, the operating mode of the image forming apparatus switches to the scan mode, and therefore, it is unnecessary for the user to perform any operation for shifting the image forming apparatus into the scan mode, resulting in enhanced operability.

Although in the embodiment described above, it is assumed that a mobile information terminal is used as the party at the other end with which an image forming apparatus carries out communications, the party at the other end should not necessarily be a mobile information apparatus but may be another information processing apparatus. Likewise, an image forming apparatus with multiple functions may be replaced by either an image forming apparatus with a single function or an image processing apparatus.

Moreover, Although in the embodiment described above, it is assumed that the mobile information terminal 200 changes (updates) the operating mode as described with reference to FIGS. 5 to 7, the operating mode may be changed in the same way by the image forming apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-123320, filed Jun. 16, 2014, which is hereby incorporated by reference herein in its entirety.

What is claimed is:

1. A system comprising:
a mobile information terminal; and
an image forming apparatus,
wherein the mobile information terminal comprises:
  a first memory; and
  a first processor connected to the first memory and configured to execute instructions that, when executed, cause the mobile information terminal to:
    set information on an operating mode of the image forming apparatus; and
    send the information on the operating mode and authentication data to the image forming apparatus in response to a near-field wireless communication being started by the mobile information terminal,
wherein the image forming apparatus comprises:
  a second memory; and
  a second processor connected to the second memory and configured to execute instructions that, when executed, cause the image forming apparatus to:
    perform an authentication process based on the authentication data sent from the mobile information terminal; and
    in a case where the authentication process is successfully completed, set the operating mode of the image forming apparatus based on the information on the operating mode sent from the mobile information terminal by the near-field wireless communication,
wherein, in a case where a scanning application is started in the mobile information terminal, the information on the operating mode sent from the mobile information terminal shows a scanning mode,
wherein, in a case where a printing application is started in the mobile information terminal, the information on the operating mode sent from the mobile information terminal shows a restriction mode,
wherein, in a case where the scanning mode is set as the operating mode of the image forming apparatus, the image forming apparatus displays an operating screen corresponding to the scanning mode, and
wherein, in a case where the restriction mode is set as the operating mode of the image forming apparatus, an operation on an operation panel of the image forming apparatus is restricted.

2. The system according to claim 1, wherein the image forming apparatus further comprises a display unit that displays a different initial screen according to the operating mode.

3. The system according to claim 1, wherein the near-field wireless communication is NFC (near-field communication).

4. An image forming apparatus capable of communicating with a mobile information terminal by near-field wireless communication, wherein the image forming apparatus comprises:

a memory; and a processor connected to the memory and configured to execute instructions that, when executed, cause the image forming apparatus to:

receive information on an operating mode of the image forming apparatus and an authentication data sent from the mobile information terminal;

perform an authentication process based on the authentication data sent from the mobile information terminal; and in a case where the authentication process is successfully completed, set an operating mode of the image forming apparatus based on the information on the operating mode sent from the mobile information terminal by the near-field wireless communication, wherein, in a case where a scanning application is started in the mobile information terminal, the information on the operating mode sent from the mobile information terminal shows a scanning mode, wherein, in a case where a printing application is started in the mobile information terminal, the information on the operating mode sent from the mobile information terminal shows a restriction mode, wherein, in a case where the scanning mode is set as the operating mode of the image forming apparatus, the image forming apparatus displays an operating screen corresponding to the scanning mode, and wherein, in a case where the restriction mode is set as the operating mode of the image forming apparatus, an operation on an operation panel of the image forming apparatus is restricted.

5. A control method for a system having a mobile information terminal and an image forming apparatus, comprising:

a setting step of setting information on an operating mode of the image forming apparatus;

a sending step of sending the information on the operating mode and authentication data to the image forming apparatus in response to a near-field wireless communication being started by the mobile information terminal;

an authentication step of performing an authentication process based on the authentication data sent from the mobile information terminal; and a control step of, in a case where the authentication process is successfully completed, set the operating mode of the image forming apparatus based on the information on the operating mode sent from the mobile information terminal by the near-field wireless communication, wherein, in a case where a scanning application is started in the mobile information terminal, the information on the operating mode sent from the mobile information terminal shows a scanning mode, wherein, in a case where a printing application is started in the mobile information terminal, the information on the operating mode sent from the mobile information terminal shows a restriction mode, wherein, in a case where the scanning mode is set as the operating mode of the image forming apparatus, the image forming apparatus displays an operating screen corresponding to the scanning mode, and wherein, in a case where the restriction mode is set as the operating mode of the image forming apparatus, an operation on an operation panel of the image forming apparatus is restricted.

\* \* \* \* \*